US011618469B2

(12) United States Patent
Kokido et al.

(10) Patent No.: US 11,618,469 B2
(45) Date of Patent: Apr. 4, 2023

(54) VEHICLE-USE REAR SIDE WARNING DEVICE AND VEHICLE-USE REAR SIDE WARNING METHOD

(71) Applicant: Mitsubishi Electric Corporation, Tokyo (JP)

(72) Inventors: Noritaka Kokido, Tokyo (JP); Takuya Taniguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 6 days.

(21) Appl. No.: 17/053,891

(22) PCT Filed: May 17, 2018

(86) PCT No.: PCT/JP2018/019027
§ 371 (c)(1),
(2) Date: Nov. 9, 2020

(87) PCT Pub. No.: WO2019/220582
PCT Pub. Date: Nov. 21, 2019

(65) Prior Publication Data
US 2021/0269055 A1 Sep. 2, 2021

(51) Int. Cl.
*B60W 50/16* (2020.01)
*B60W 30/095* (2012.01)
(Continued)

(52) U.S. Cl.
CPC ........ *B60W 50/16* (2013.01); *B60W 30/0956* (2013.01); *B60W 30/18163* (2013.01);
(Continued)

(58) Field of Classification Search
CPC ............. B60W 50/16; B60W 30/0956; B60W 30/18163; B60W 40/08; B60W 40/105;
(Continued)

(56) References Cited

U.S. PATENT DOCUMENTS

| 6,133,825 A * | 10/2000 | Matsuoka | B60Q 9/008 340/436 |
| 7,038,577 B2 * | 5/2006 | Pawlicki | B60Q 9/008 340/435 |

(Continued)

FOREIGN PATENT DOCUMENTS

| JP | 2000-344033 A | 12/2000 |
| JP | 2003-118523 A | 4/2003 |

(Continued)

OTHER PUBLICATIONS

Office Action dated May 11, 2021 from the Japanese Patent Office in JP Application No. 2020-518893.

(Continued)

*Primary Examiner* — Mohamed Barakat
(74) *Attorney, Agent, or Firm* — Sughrue Mion, PLLC; Richard C. Turner

(57) ABSTRACT

An approaching moving object detecting unit that detects an approaching moving object existing within a predetermined range on a rear side of an own vehicle based on outputs of a periphery monitoring camera that acquires an image of the rear side of the own vehicle and a sensor that detects an approaching moving object, a relative speed detecting unit that detects relative speeds of an approaching moving object and the own vehicle, and a warning output determiner that, when an approaching moving object is detected and the own vehicle is attempting to change lane, causes a warning of a warning output unit to be generated when a relative speed detected by the relative speed detecting unit exceeds a reference relative speed with respect to which a lane change can be carried out, are provided with an object of restricting an excessive notification when notifying of the existence of an approaching moving object.

13 Claims, 7 Drawing Sheets

(51) Int. Cl.
*B60W 30/18* (2012.01)
*B60W 40/08* (2012.01)
*B60W 40/105* (2012.01)
*G06V 20/59* (2022.01)
*B60W 50/14* (2020.01)

(52) U.S. Cl.
CPC .......... *B60W 40/08* (2013.01); *B60W 40/105* (2013.01); *G06V 20/597* (2022.01); *B60W 2050/143* (2013.01); *B60W 2050/146* (2013.01); *B60W 2540/225* (2020.02); *B60W 2540/229* (2020.02); *B60W 2554/4041* (2020.02); *B60W 2554/80* (2020.02)

(58) Field of Classification Search
CPC ... B60W 2554/4041; B60W 2540/225; B60W 2540/229; B60W 2554/80; B60W 2050/143; B60W 2050/146; G06V 20/597
See application file for complete search history.

(56) References Cited

U.S. PATENT DOCUMENTS

| | | | | |
|---|---|---|---|---|
| 2009/0210157 | A1* | 8/2009 | Lee | G01S 7/527 701/301 |
| 2009/0243880 | A1* | 10/2009 | Kiuchi | G08G 1/166 342/107 |
| 2014/0132426 | A1* | 5/2014 | Cannizzaro | G08G 1/163 340/933 |
| 2015/0360684 | A1* | 12/2015 | Matsuno | B60Q 9/00 701/23 |
| 2016/0110618 | A1* | 4/2016 | Oba | G06V 20/58 348/148 |
| 2017/0309181 | A1* | 10/2017 | Lee | B60Q 5/006 |
| 2018/0201192 | A1* | 7/2018 | Ishida | B60Q 9/008 |

FOREIGN PATENT DOCUMENTS

| | | |
|---|---|---|
| JP | 2009-262738 A | 11/2009 |
| JP | 2014-178971 A | 9/2014 |
| JP | 2016-004443 A | 1/2016 |
| JP | 2017-091094 A | 5/2017 |
| JP | 2017-116992 A | 6/2017 |
| JP | 2018-061260 A | 4/2018 |

OTHER PUBLICATIONS

International Search Report for PCT/JP2018/019027 dated, Jun. 26, 2018.
Chinese Office Action dated Feb. 11, 2022 from the China National Intellectual Property Administration in CN Application No. 201880093353.7.
Communication dated Sep. 28, 2022, issued in Chinese Application No. 201880093353.7.

* cited by examiner

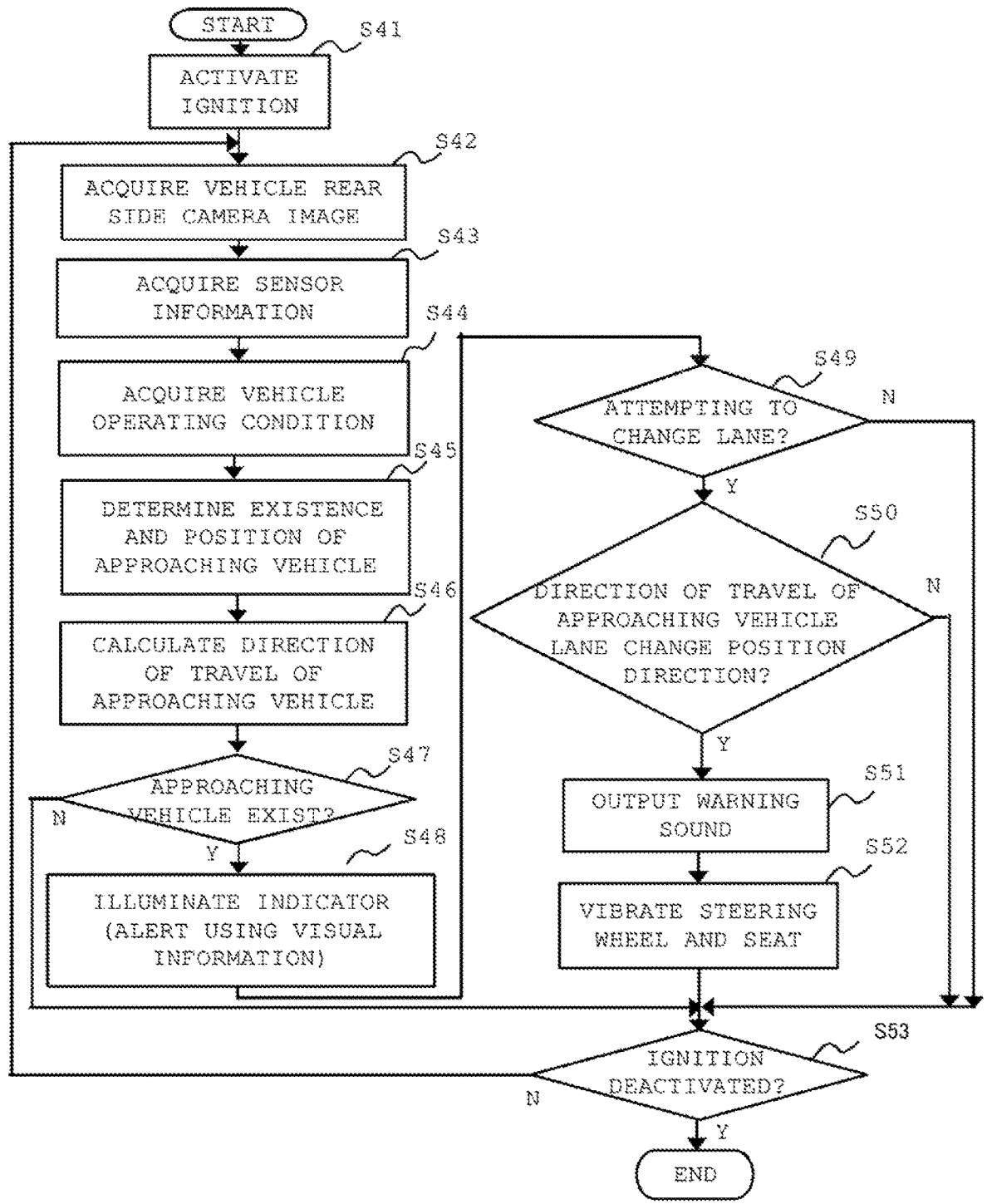

VEHICLE-USE REAR SIDE WARNING DEVICE AND VEHICLE-USE REAR SIDE WARNING METHOD

CROSS REFERENCE TO RELATED APPLICATIONS

This application is a National Stage of International Application No. PCT/JP2018/019027 filed May 17, 2018.

TECHNICAL FIELD

The present application relates to the field of a vehicle-use rear side warning device and a vehicle-use rear side warning method.

BACKGROUND ART

A vehicle-use rear side warning device that is mounted in a vehicle and notifies a driver that a vehicle exists on a rear side of the vehicle is already known.

This kind of existing vehicle-use rear side warning device includes traveling state detection means that detects a predetermined traveling state of an own vehicle, first notification target region setting means that, based on a detected traveling state, sets a first notification target region on a rear side on an opposite lane side of the own vehicle, second notification target region setting means that, based on a detected traveling state, sets a second notification target region on a rear side on a hard shoulder side of the own vehicle, first vehicle detecting means that detects a vehicle existing in the first notification target region and approaching the own vehicle, second vehicle detecting means that detects a vehicle existing in the second notification target region and approaching the own vehicle, first notifying means that notifies a driver of the existence of an approaching vehicle in the first notification target region, and second notifying means that notifies the driver of the existence of an approaching vehicle in the detected second notification target region, and when a vehicle existing in the first or the second notification target region is detected, and the own vehicle attempts to change lane via an operation of a direction indicator or an operation of a steering wheel, the driver is notified of the existence of an approaching vehicle by the first or the second notifying means (for example, refer to Patent Literature 1).

CITATION LIST

Patent Literature

Patent Literature 1: JP-A-2003-118523

SUMMARY OF INVENTION

Technical Problem

The kind of existing vehicle-use rear side warning device described in Patent Literature 1 is such that when a vehicle existing in the first or the second notification target region is detected, the driver is notified of the existence of the detected vehicle by the first or the second notifying means, but as no consideration is given to a relativity relationship between the own vehicle and an approaching vehicle, the driver may also be notified of a vehicle by which there is no fear of being neared, or a vehicle that has sufficient leeway until coming near, and this kind of excessive notification is extremely annoying for the driver.

The present application has been made to solve the above problem and an object of the present application is to restrict excessive notification when notifying of the existence of a vehicle on a rear side of an own vehicle, thereby providing a driver with a pleasant driving environment.

Solution to Problem

A vehicle-use rear side warning device disclosed in the present application is a vehicle-use rear side warning device including a periphery monitoring camera unit that acquires an image of a rear side of an own vehicle, a sensor unit that detects an approaching moving object existing on the rear side of the own vehicle, a vehicle condition detecting unit that detects an operating condition of the own vehicle, a warning output unit that displays visual information in the own vehicle and causes auditory information, and contact information formed of a vibration, to be generated, and a central processing unit that causes the warning output unit to operate based on outputs of the periphery monitoring camera unit, the sensor unit, and the vehicle condition detecting unit. The central processing unit has an approaching moving object detecting unit that detects an approaching moving object existing within a predetermined range on the rear side of the own vehicle based on outputs of the periphery monitoring camera unit and the sensor unit, a relative speed detecting unit that detects relative speeds of an approaching moving object detected by the approaching moving object detecting unit and the own vehicle, and a warning output determining unit that, when an approaching moving object is detected by the approaching moving object detecting unit and a matter that the own vehicle is attempting to change lane is detected by the vehicle condition detecting unit, causes a warning of the warning output unit to be generated when a relative speed detected by the relative speed detecting unit exceeds a reference relative speed with respect to which a lane change can be carried out, based on outputs of the approaching moving object detecting unit, the relative speed detecting unit, and the vehicle condition detecting unit.

Also, a vehicle-use rear side warning device disclosed in the present application is a vehicle-use rear side warning device including a periphery monitoring camera unit that acquires an image of a rear side of an own vehicle, a sensor unit that detects an approaching moving object existing on the rear side of the own vehicle, a vehicle condition detecting unit that detects an operating condition of the own vehicle, a warning output unit that displays visual information in the own vehicle and causes auditory information, and contact information formed of a vibration, to be generated, and a central processing unit that causes the warning output unit to operate based on outputs of the periphery monitoring camera unit, the sensor unit, and the vehicle condition detecting unit. The central processing unit has an approaching moving object detecting unit that detects an approaching moving object existing within a predetermined range on the rear side of the own vehicle based on outputs of the periphery monitoring camera unit and the sensor unit, a collision time detecting unit that detects a time remaining until a collision between an approaching moving object detected by the approaching moving object detecting unit and the own vehicle, and a warning output determining unit that, when an approaching moving object is detected by the approaching moving object detecting unit and a matter that the own vehicle is attempting to change lane is detected by the vehicle condition detecting unit, causes a warning of the warning output unit to be generated based on a result of comparing a time detected by the collision time detecting unit and a reference time with respect to which a lane change can be carried out, based on outputs of the approaching moving object detecting unit, the collision time detecting unit, and the vehicle condition detector.

Also, a vehicle-use rear side warning device disclosed in the present application is a vehicle-use rear side warning device including a periphery monitoring camera unit that acquires an image of a rear side of an own vehicle, a sensor unit that detects an approaching moving object existing on the rear side of the own vehicle, a vehicle condition detecting unit that detects an operating condition of the own vehicle, a warning output unit that displays visual information in the own vehicle and causes auditory information, and contact information formed of a vibration, to be generated, and a central processing unit that causes the warning output unit to operate based on outputs of the periphery monitoring camera unit, the sensor unit, and the vehicle condition detecting unit. The central processing unit has an approaching moving object detecting unit that detects an approaching moving object existing within a predetermined range on the rear side of the own vehicle based on outputs of the periphery monitoring camera unit and the sensor unit, an approaching moving object travel direction detecting unit that detects that a direction of travel of the approaching moving object is a direction differing from a direction of travel of the own vehicle based on an output of the approaching moving object detecting unit, and a warning output determining unit that, when an approaching moving object is detected by the approaching moving object detecting unit and a matter that the own vehicle is attempting to change lane is detected by the vehicle condition detecting unit, causes a warning of the warning output unit to be generated based on an output of the approaching moving object travel direction detecting unit, based on outputs of the approaching moving object detecting unit, the approaching moving object travel direction detecting unit, and the vehicle condition detecting unit.

A vehicle-use rear side warning method disclosed in the present application is characterized by including a first step of detecting an approaching moving object existing within a predetermined range in a periphery of an own vehicle, a second step of outputting a warning when the own vehicle attempts to change lane to a neighboring traveling lane when an approaching moving object is detected in the first step, a third step of detecting relative speeds of the approaching moving object detected in the first step and the own vehicle, and a fourth step of controlling the warning output of the second step based on a result of comparing a relative speed detected in the third step and a reference relative speed.

Also, a vehicle-use rear side warning method disclosed in the present application is characterized by including a first step of detecting an approaching moving object existing within a predetermined range in a periphery of an own vehicle, a second step of outputting a warning when the own vehicle attempts to change lane to a neighboring traveling lane when an approaching moving object is detected in the first step, a fifth step of computing a time remaining until a collision between the approaching moving object detected in the first step and the own vehicle, and a sixth step of controlling the warning output of the second step based on a result of comparing a time obtained in the fifth step and a reference time.

Also, a vehicle-use rear side warning method disclosed in the present application is characterized by including a first step of detecting an approaching moving object existing within a predetermined range in a periphery of an own vehicle, a second step of outputting a warning when the own vehicle attempts to change lane to a neighboring traveling lane when an approaching moving object is detected in the first step, a seventh step of detecting that a direction of travel of the approaching moving object is a direction differing from a direction of travel of the own vehicle, and an eighth step of controlling the warning output of the second step based on a result of a detection in the seventh step.

Advantageous Effects of Invention

According to the vehicle-use rear side warning device disclosed in the present application, a generation of an excessive warning when notifying a driver of an own vehicle of the existence of an approaching moving object is restricted, whereby the driver can be provided with a pleasant driving environment.

BRIEF DESCRIPTION OF DRAWINGS

FIG. 7 is a flowchart for describing an operation of the vehicle-use rear side warning device in the third embodiment.

DESCRIPTION OF EMBODIMENTS

Hereafter, embodiments will be described based on the drawings.

First Embodiment

Figure 1:
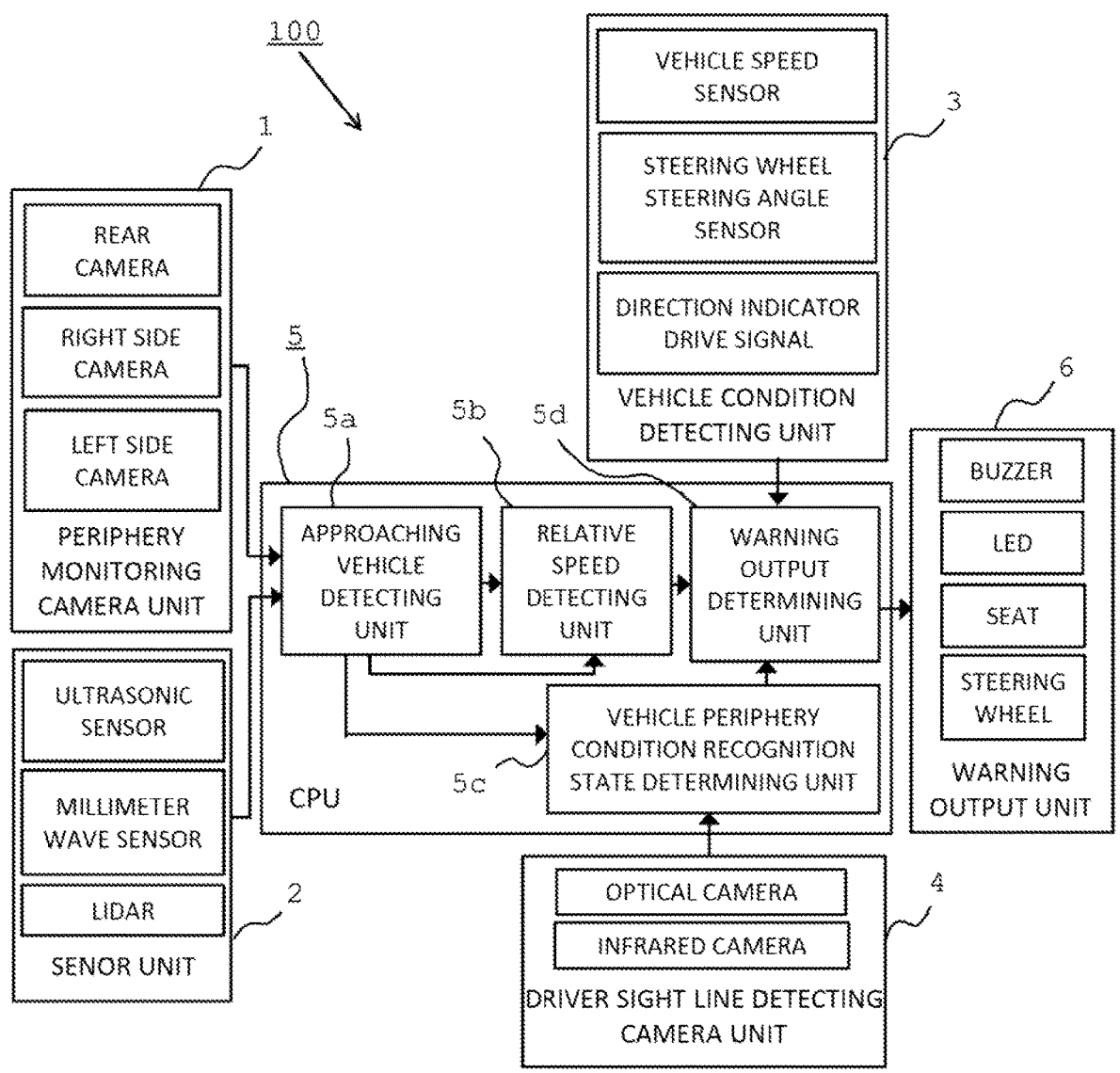
FIG. 1 is a block diagram schematically showing a configuration of a vehicle-use rear side warning device according to a first embodiment.

FIG. 1 is a block diagram schematically showing a configuration of a vehicle-use rear side warning device according to a first embodiment.

In the drawing, a vehicle-use rear side warning device 100 is configured of a periphery monitoring camera unit 1 including a rear camera, a right side camera, and a left side camera, a sensor unit 2 formed of an ultrasonic sensor, a millimeter wave sensor, or Lidar, a vehicle condition detecting unit 3 that detect an operating state of a vehicle speed sensor, a steering wheel steering angle sensor, or a direction indicator in a vehicle, a driver sight line detecting camera unit 4 including an optical camera or an infrared camera, a central processing unit 5 (hereafter called a CPU) that determines and outputs a necessity or otherwise of a warning based on signals from the periphery monitoring camera unit 1, the sensor unit 2, the vehicle condition detecting unit 3, and the driver sight line detecting camera unit 4, and a warning output unit 6 to which an output from the CPU 5 is supplied, and which outputs a warning.

Herein, the periphery monitoring camera unit 1 is such that a multiple of optical cameras such as a rear camera, a left side camera, and a right side camera are attached directed toward a rear side (oblique rear) of the vehicle, and the periphery monitoring camera unit 1 acquires image information from the vehicle rear side. Although three cameras are shown as an example in FIG. 1, any number of cameras may be installed provided that the cameras are for filming the rear side of an own vehicle.

Also, the senor unit 2 is formed of at least one active sensor from among ultrasonic radar, millimeter wave radar, and Lidar, and detects the existence of an approaching vehicle by emitting an ultrasonic wave, a millimeter wave, or a laser beam into a periphery of the own vehicle, and receiving a reflection thereof.

Furthermore, the vehicle condition detecting unit 3 acquires CAN (controller area network) signals such as a vehicle speed signal, a steering wheel steering angle signal, and a turn signal based on a vehicle speed sensor output, a steering wheel steering angle sensor output, and a direction indicator drive signal.

Also, the driver sight line detecting camera unit 4 is formed of one or a multiple of optical cameras, infrared cameras, or eye cameras, and acquires a driver's face orientation and eyeball movement.

Furthermore, the warning output unit 6 causes a buzzer or an LED to operate based on warning output information from the CPU 5, and furthermore, causes a seat and the steering wheel to vibrate.

Figure 2:
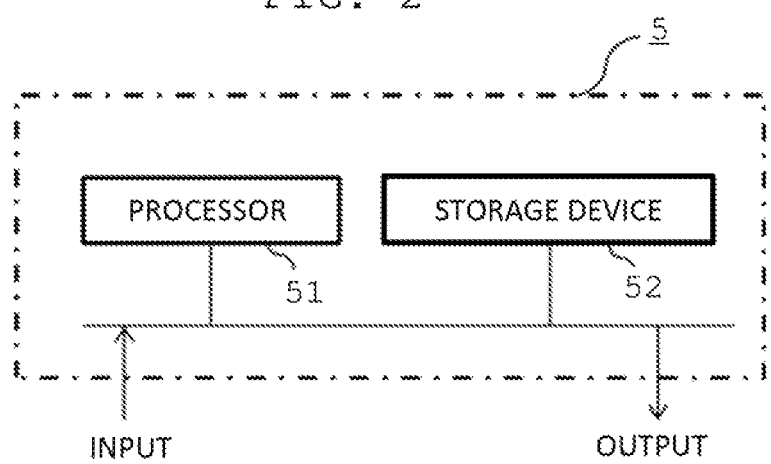
FIG. 2 is a block diagram showing a hardware configuration of a CPU that is a main portion of the vehicle-use rear side warning device in FIG. 1.

Meanwhile, the CPU 5 includes an approaching vehicle detecting unit 5a, a relative speed detecting unit 5b, a vehicle periphery condition recognition state determining unit 5c, and a warning output determining unit 5d, and these constituent components are formed by a processor 51 and a storage unit 52, as shown in a hardware configuration example in FIG. 2. Although details are not shown in the drawing, the storage unit 52 includes a volatile storage device, such as a random access memory, and a non-volatile auxiliary storage device, such as a flash memory, and executes a program input from the storage device 52. In this case, the program is input from the auxiliary storage device into the processor 51 via the volatile storage device. Also, the processor 51 may output data such as a computation result to the volatile storage device of the storage device 52, or may save the data in the auxiliary storage device via the volatile storage device. Furthermore, the storage unit 52 may include a hard disk auxiliary storage device instead of a flash memory.

The approaching vehicle detecting unit 5a in the CPU 5 carries out an image recognition process based on image information imported from the periphery monitoring camera unit 1 and sensor information imported from the sensor unit 2, detects whether an approaching vehicle such as a vehicle or a motorcycle exists within a predetermined distance range on the rear side of the own vehicle based on a sensor detection result and an image recognition detection result, and calculates a position of the approaching vehicle with respect to the own vehicle when an approaching vehicle exists. The image recognition process may be carried out using machine learning such as HoG (histogram of oriented gradients) or deep learning, or may be carried out using a flow such as an optical flow or motion stereo.

Also, the relative speed detecting unit 5b in the CPU 5 calculates a relative speed based on current position information among approaching vehicle information imported from the approaching vehicle detecting unit 5a, and on position information received in the past. The relative speed calculation may be carried out by simply calculating an amount of movement per unit time based on two points, those being a past position at a certain time and the current position, or may be carried out using a filtering process, such as Kalman filtering, based on multiple items of past position information and the current position information, or furthermore, another method may be used. The relative speed has a positive value when the approaching vehicle is nearing the own vehicle, and has a negative value when the approaching vehicle is becoming more distant.

Furthermore, the vehicle periphery condition recognition state determining unit 5c in the CPU 5 calculates the driver's face orientation and sight line direction from images of the driver's face orientation and movement of one or both eyeballs acquired from the driver sight line detecting camera unit 4, makes a comparison with approaching vehicle position information acquired by the approaching vehicle detecting unit 5a, and determines whether or not the driver is recognizing the peripheral condition of the own vehicle. As a method of determining whether or not the driver is recognizing the vehicle peripheral condition, the vehicle periphery condition recognition state determining unit 5c determines that the driver is recognizing the peripheral condition on the rear side of the own vehicle when detecting, based on the calculated driver's face orientation and sight line direction, that the driver has focused continuously for a preset predetermined time or longer in a direction in which an approaching vehicle exists, or on a side mirror on the side on which the approaching vehicle exists, or when detecting that the driver has focused a predetermined number of times or greater by counting the number of times the driver focuses within a preset predetermined time.

Also, the warning output determining unit 5d in the CPU 5 decides on a warning method based on approaching vehicle information acquired from the approaching vehicle detecting unit 5a, relative speed information acquired from the relative speed detecting unit 5b, and vehicle periphery condition recognition state information acquired from the vehicle periphery condition recognition state determining unit 5c, and outputs a drive signal to the warning output unit 6. Specifically, when an approaching vehicle exists, the warning output determining unit 5d generates an output such that an indicator installed in vicinities of left and right side mirrors and formed of, for example, an LED, is illuminated, regardless of the relative speed of the approaching vehicle or the vehicle periphery condition recognition state of the driver. By so doing, the existence of the approaching vehicle is communicated to the driver using visual information, and an alert can be carried out when carrying out a lane change.

Furthermore, when the driver operates the steering wheel, or activates a turn signal on a neighboring traveling lane side, in order to carry out a change of lane to a neighboring traveling lane side on which an approaching vehicle exists in a state wherein an alert using visual information is being issued, the warning output determining unit 5d compares the relative speed of the approaching vehicle acquired from the relative speed detecting unit 5b and a reference relative speed with respect to which a lane change can be carried out, and when the relative speed of the approaching vehicle is greater than the reference relative speed of approaching the own vehicle, the warning output determining unit 5d causes a generation of a warning using a buzzer and a generation of a warning using vibration of the seat and the steering wheel, thereby communicating the existence of the approaching vehicle to the driver more clearly, and prompting an interruption of the lane change operation.

When the relative speed of the approaching vehicle is lower than the reference relative speed, there is no fear of the approaching vehicle nearing the own vehicle, or there is sufficient leeway until the approaching vehicle comes near, because of which the warning output determining unit 5*d* does not cause an output of a warning sound using a buzzer or a generation of a warning using vibration of the seat and the steering wheel, and excessive notification to the driver is restricted.

Next, an operation in the first embodiment will be described using a flowchart shown in FIG. 3.

Firstly, when a car ignition is activated (step S1), the CPU 5 acquires a vehicle rear side camera image using the periphery monitoring camera unit 1 (step S2), and acquires sensor information using the sensor unit 2, which is configured of one or a multiple of active sensors (step S3). Next, the CPU 5 acquires a driver sight line detecting camera image using the driver sight line detecting camera unit 4 (step S4), and acquires a vehicle operating condition using the vehicle condition detecting unit 3 (step S5).

Next, the approaching vehicle detecting unit 5*a* determines whether an approaching vehicle such as a vehicle or a motorcycle exists within a predetermined distance range on the rear side of the own vehicle based on sensor information imported from the sensor unit 2 and image information imported from the periphery monitoring camera unit 1, and calculates a position of the approaching vehicle with respect to the own vehicle when an approaching vehicle exists (step S6). Subsequently, the relative speed detecting unit 5*b* calculates a relative speed based on current position information regarding the approaching vehicle in the approaching vehicle detecting unit 5*a*, and on position information received in the past (step S7).

Next, the vehicle periphery condition recognition state determining unit 5*c* calculates the driver's face orientation and sight line direction from images of the driver's face orientation and movement of one or both eyeballs acquired from the driver sight line detecting camera unit 4, makes a comparison with approaching vehicle position information among approaching vehicle information acquired from the approaching vehicle detecting unit 5*a*, and determines whether or not the driver is recognizing the peripheral condition of the own vehicle (step S8).

Next, the warning output determining unit 5*d* determines whether or not an approaching vehicle exists on the rear side of the own vehicle based on approaching vehicle information from the approaching vehicle detecting unit 5*a* (step S9), and when no approaching vehicle exists (N), the warning output determining unit 5*d* proceeds to step S18, as there is no need to carry out a rear side warning process. Also, when an approaching vehicle exists (Y), the warning output determining unit 5*d* proceeds to step S10, and causes an indicator formed of an LED or the like to be illuminated. Next, in a state wherein the indicator is illuminated, the warning output determining unit 5*d* determines from vehicle condition information imported from the vehicle condition detecting unit 3 whether or not the own vehicle is attempting to change lane to a neighboring traveling lane side on which the approaching vehicle exists (step S11).

When the warning output determining unit 5*d* determines in step S11 that the own vehicle is not attempting to change lane (N), the warning output determining unit 5*d* proceeds to step S18 with only the visual alert of the indicator illumination. Also, when the warning output determining unit 5*d* determines that the own vehicle is attempting to change lane (Y), the warning output determining unit 5*d* determines whether the driver is recognizing the peripheral condition of the own vehicle based on vehicle periphery condition recognition state information imported from the vehicle periphery condition recognition state determining unit 5*c* (step S12). Herein, when the warning output determining unit 5*d* determines that the driver is recognizing the peripheral condition of the own vehicle (Y), the warning output determining unit 5*d* sets a reference relative speed with respect to which a lane change can be carried out to be high (step S13), thereby facilitating restriction of a warning generation. Also, when the warning output determining unit 5*d* determines that the driver is not recognizing the peripheral condition of the own vehicle (N), the warning output determining unit 5*d* sets the reference relative speed to be low in comparison with that when determining that the driver is recognizing the peripheral condition of the own vehicle (step S14), thereby facilitating a warning generation.

When the position of the approaching vehicle is near the own vehicle, a warning is more easily generated by the reference relative speed being set low, and when the position of the approaching vehicle is far away, a warning can be more easily restricted by the reference relative speed being set high. By causing the reference relative speed to vary in this way, a determination of whether or not to generate a warning can be caused to be carried out accurately. Also, the reference relative speed may be a fixed value.

Next, in step S15, the warning output determining unit 5*d* determines whether or not the relative speed of the approaching vehicle acquired from the relative speed detecting unit 5*b* is greater than the reference relative speed, and when the relative speed of the approaching vehicle is greater than the reference relative speed (Y), the warning output determining unit 5*d* supplies an output to the warning output unit 6, thereby causing a warning sound to be output by a buzzer (step S16), and furthermore, causes the seat and the steering wheel to vibrate (step S17).

Also, when the warning output determining unit 5*d* determines in step S15 that the relative speed of the approaching vehicle is less than the reference relative speed (N), the warning output determining unit 5*d* proceeds directly to step S18, without causing a generation of a warning sound using a buzzer or a warning using vibration of the seat and the steering wheel, whereby excessive warning notification is restricted.

Lastly, in step S18, the CPU 5 determines whether a vehicle power supply is in an off-state, and when the power supply is in an on-state, the CPU 5 returns to step S1 and repeats the heretofore described process. Also, when the vehicle power supply is in an off-state, the CPU 5 causes the whole process to end.

In the first embodiment, the rear side warning device 100 is caused to operate from an activated ignition state to a deactivated ignition state, but the rear side warning device 100 may be caused to start up automatically when the own vehicle speed is a speed equal to or greater than a threshold, or in accompaniment to the driver operating a switch.

According to the vehicle-use rear side warning device 100 in the present application, as heretofore described, the vehicle-use rear side warning device 100 determines whether an approaching vehicle exists within a predetermined range in an own vehicle periphery when the own vehicle attempts to change lane, generates a warning with respect to a dangerous approaching vehicle that is exceeding a reference relative speed, and restricts generation of a warning with respect to an approaching vehicle by which there is no fear of being neared, or which has sufficient leeway until coming near, because of which there is no excessive generation of a warning to a driver, and a pleasant driving environment can be provided.

Second Embodiment

Figure 4:
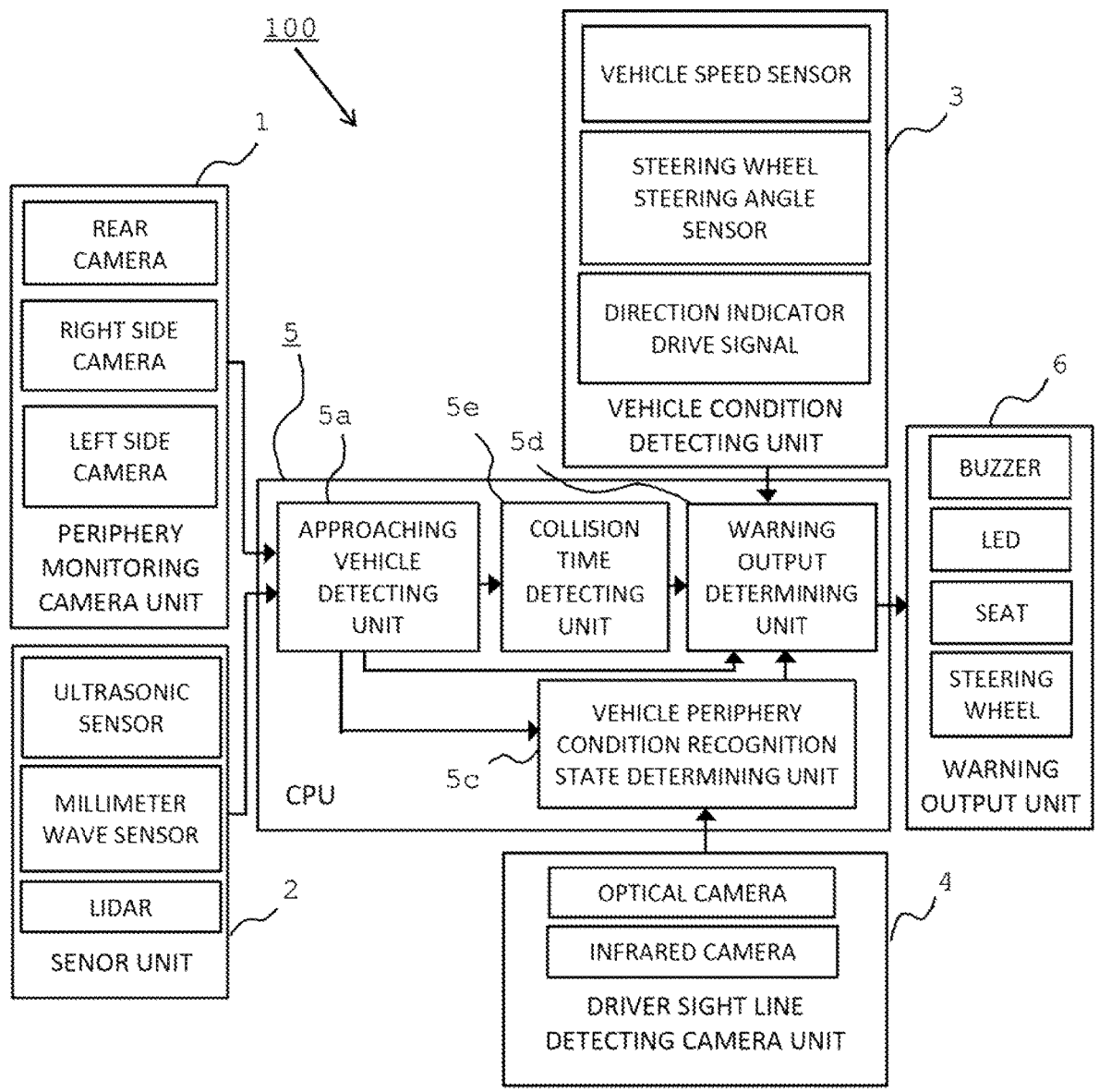
FIG. 4 is a block diagram schematically showing a configuration of a vehicle-use rear side warning device according to a second embodiment.
Figure 5:
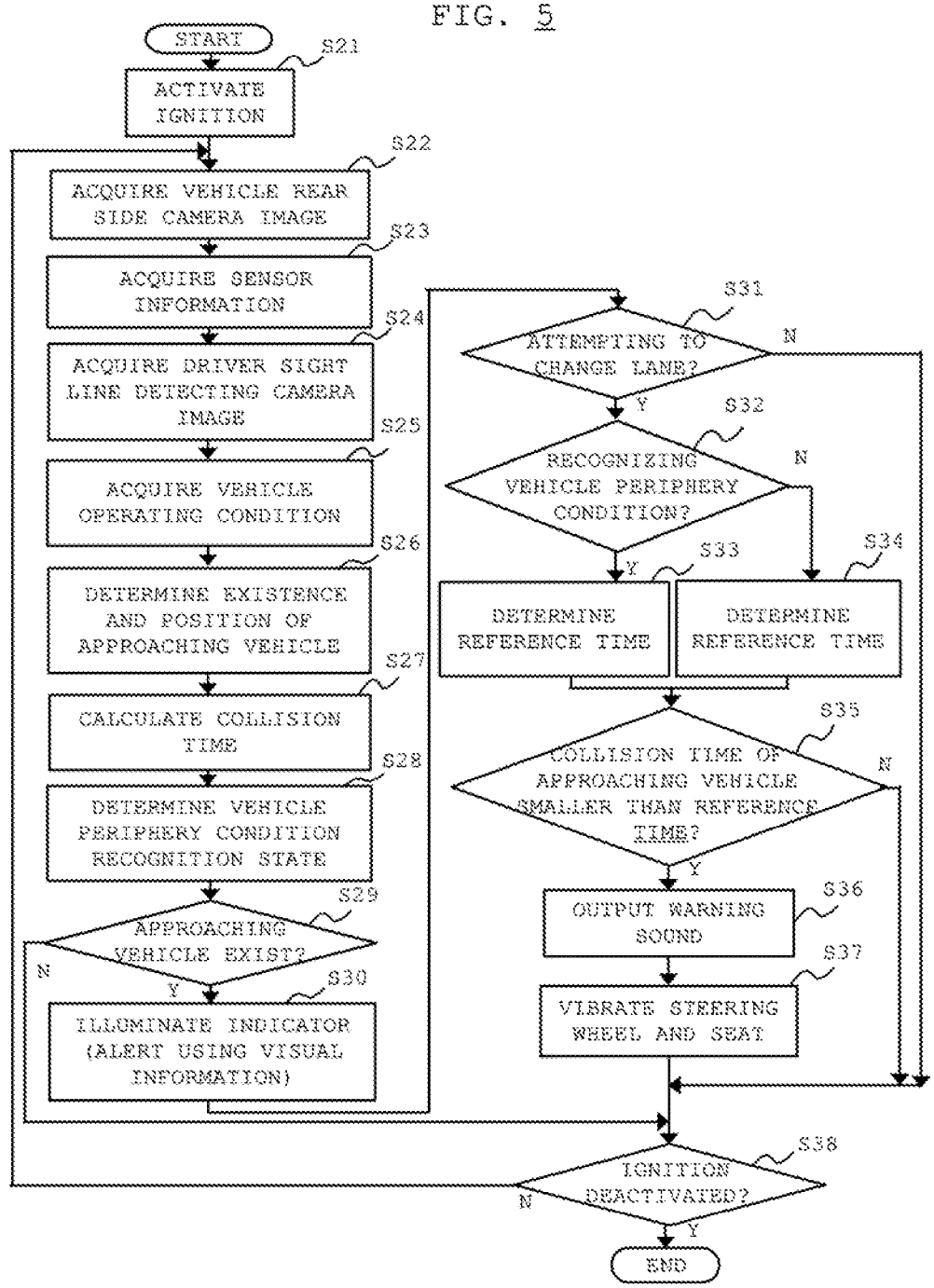
FIG. 5 is a flowchart for describing an operation of the vehicle-use rear side warning device in the second embodiment.

FIG. 4 is a block diagram schematically showing a configuration of a vehicle-use rear side warning device according to a second embodiment of the present application.

In the second embodiment, a collision time detecting unit 5e is provided instead of the relative speed detecting unit 5b of the first embodiment. The collision time detecting unit 5e calculates the relative speed of an approaching vehicle based on current position information among approaching vehicle information imported from the approaching vehicle detecting unit 5a and on position information received in the past, and based on the calculated relative speed and information regarding the current position of the approaching vehicle, calculates a time until reaching a vehicle position in a neighboring lane in the event that the own vehicle changes lane as a collision time, and outputs the collision time to the warning output determining unit 5d.

The warning output determining unit 5d decides on a warning method based on approaching vehicle information acquired from the approaching vehicle detecting unit 5a, collision time information acquired from the collision time detecting unit 5e, and vehicle periphery condition recognition state information acquired from the vehicle periphery condition recognition state determining unit 5c, and causes the warning output unit 6 to generate an output.

As other configurations are the same as in the first embodiment, the same reference signs are allotted, and a description will be omitted.

Next, an operation of the vehicle-use rear side warning device 100 in the second embodiment will be described using a flowchart shown in FIG. 45.

Figure 3:
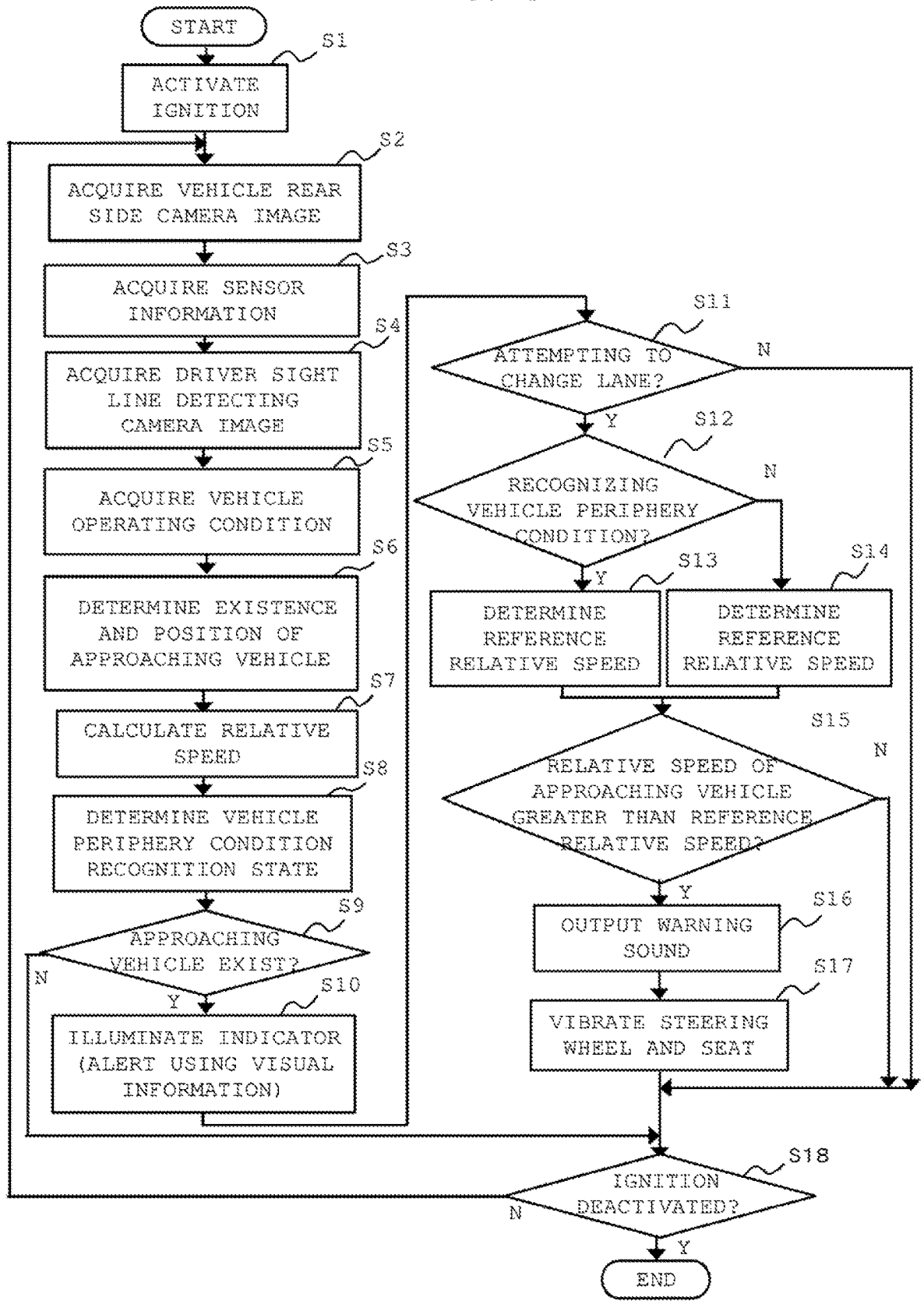
FIG. 3 is a flowchart for describing an operation of the vehicle-use rear side warning device in the first embodiment.

Firstly, when a car ignition is activated (step S21), the CPU 5 acquires a vehicle rear side camera image, sensor information, a driver sight line detecting camera image, and a vehicle operating condition (steps S22 to S25), in the same way as in the flowchart shown in FIG. 3., and determines the existence or otherwise of an approaching vehicle, and the position of the approaching vehicle, based on the sensor information and the vehicle rear side camera image (step S26).

Next, the relative speed of the approaching vehicle is calculated by the collision time detecting unit 5e based on current position information among approaching vehicle information imported by the approaching vehicle detecting unit 5a and on position information received in the past, and the collision time detecting unit 5e, based on the calculated relative speed of the approaching vehicle and current position information, calculates a time until reaching a vehicle position in a neighboring lane in the event that the own vehicle changes lane as a collision time (step S27).

Next, the driver's face orientation and sight line direction are calculated by the vehicle periphery condition recognition state determining unit 5c from images of the driver's face orientation and movement of one or both eyeballs acquired by the driver sight line detecting camera unit 4, and the vehicle periphery condition recognition state determining unit 5c makes a comparison with approaching vehicle position information among approaching vehicle information acquired from the approaching vehicle detecting unit 5a, and determines whether or not the driver is recognizing the peripheral condition of the own vehicle (step S28).

Subsequently, the warning output determining unit 5d determines whether or not an approaching vehicle exists on the rear side of the own vehicle based on approaching vehicle information acquired by the approaching vehicle detecting unit 5a (step S29), and when no approaching vehicle exists (N), the warning output determining unit 5d proceeds to step S38, as there is no need to carry out a rear side warning process. When an approaching vehicle exists (Y), the warning output determining unit 5d causes an indicator formed of an LED or the like installed in vicinities of the left and right side mirrors to be illuminated (step S30).

Next, in a state wherein the indicator is illuminated, the warning output determining unit 5d determines from vehicle operating condition information acquired from the vehicle condition detecting unit 3 whether or not the own vehicle is attempting to change lane to a neighboring traveling lane side on which the approaching vehicle exists (step S31), and proceeds to step S38 with only the alert provided by visual information when the own vehicle is not attempting to change lane (N).

Also, when the own vehicle is attempting to change lane (Y), whether the driver is recognizing the peripheral condition of the own vehicle is determined by the vehicle periphery condition recognition state determining unit 5c based on vehicle periphery condition recognition state information (step S32), and when the driver is recognizing the peripheral condition of the own vehicle (Y), the warning output determining unit 5d proceeds to step S33, and decides on a reference time with respect to which a lane change can be carried out. The reference time is set low, thereby facilitating restriction of a warning. Meanwhile, when the driver is not recognizing the peripheral condition of the own vehicle (N), the warning output determining unit 5d proceeds to step S34, and decides on a reference time greater than that of step S33, thereby facilitating a warning generation.

The warning output determining unit 5d determines whether or not the collision time of the approaching vehicle acquired by the collision time detecting unit 5e is less than the decided reference time (step S35), and when the collision time of the approaching vehicle is less than the reference time (Y), the warning output determining unit 5d outputs a drive signal to the warning output unit 6, thereby causing a warning sound to be generated by a buzzer or the like (step S36), and causes the seat and the steering wheel to vibrate (step S37), because carrying out a lane change is dangerous. Because of this, the existence of the approaching vehicle is communicated clearly using auditory information and contact information, and an interruption of the lane change operation can be prompted. Also, when the collision time of the approaching vehicle is greater than the reference time (N), the warning output determining unit 5d proceeds to step S38, without causing a generation of a warning using a warning sound or a vibration of the seat and the steering wheel, whereby excessive notification to the driver is restricted.

Lastly, after the rear side warning process, the CPU 5 determines whether the vehicle power supply key is in an off-state (step S38), returns to step S22 and repeats the heretofore described process when the power supply is in an on-state (N), and causes the whole process to end when the vehicle power supply is in an off-state.

Although the rear side warning device 100 is caused to operate from an activated ignition state to a deactivated ignition state, the rear side warning device 100 may be caused to start up automatically when the own vehicle speed is a speed equal to or greater than a threshold, or by the driver operating a switch, or the like. Also, the reference time, which is a threshold for determining whether or not to carry out a warning, may be a fixed value.

In the second embodiment, as heretofore described, a configuration is such that when the own vehicle attempts to change lane when an approaching vehicle exists within a predetermined range in the periphery of the own vehicle, a warning output is controlled in accordance with whether or not the time remaining until the own vehicle collides with the approaching vehicle is less than a reference time. Because of this, a warning is carried out with respect to a dangerous approaching vehicle, and generation of a warning is restricted with respect to an approaching vehicle by which there is no fear of being neared, or which has sufficient leeway until coming near, because of which there is no excessive notification to the driver, and a pleasant driving environment can be provided.

Third Embodiment

Figure 6:
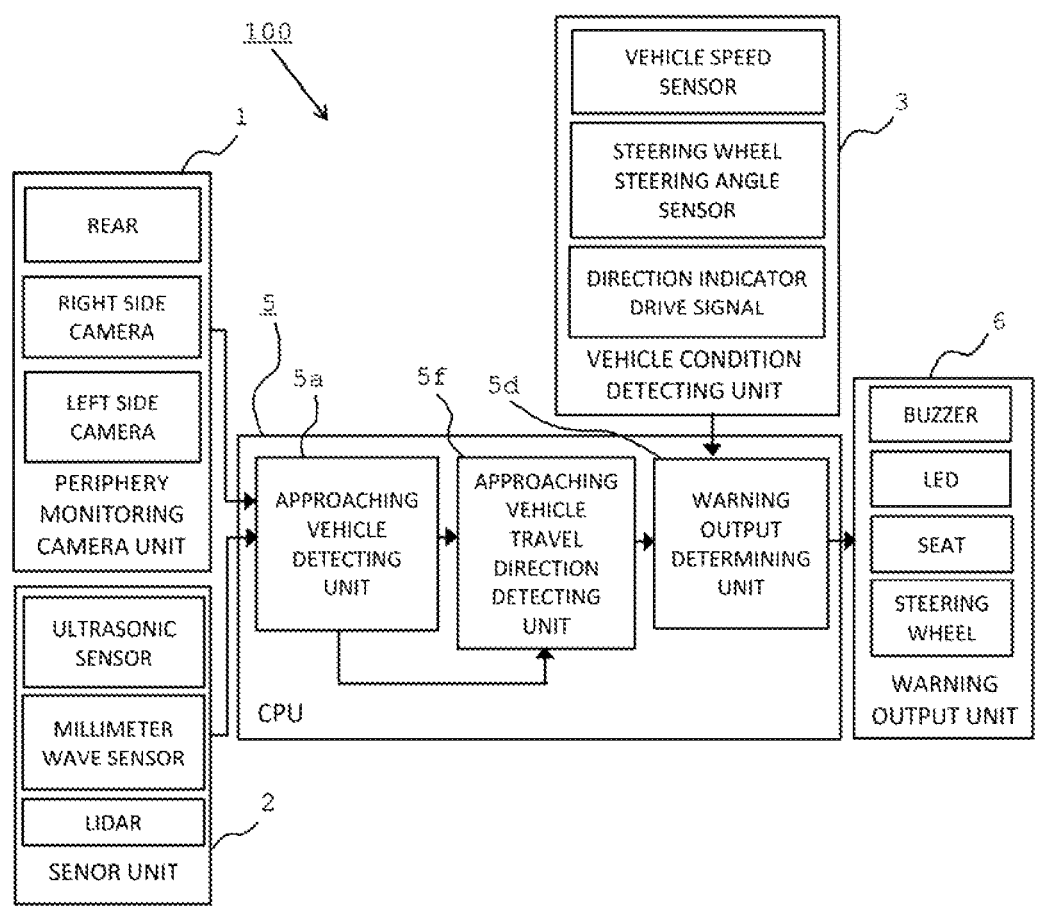
FIG. 6 is a block diagram schematically showing a configuration of a vehicle-use rear side warning device according to a third embodiment.

FIG. 6 is a block diagram schematically showing a configuration of a vehicle-use rear side warning device according to a third embodiment of the present application.

In the third embodiment, an approaching vehicle travel direction detecting unit 5f is provided instead of the relative speed detecting unit 5b, the vehicle periphery condition recognition state determining unit 5c, and the driver sight line detecting camera unit 4 of the first embodiment. The approaching vehicle travel direction detecting unit 5f calculates a direction of travel of an approaching vehicle based on current position information among approaching vehicle information imported by the approaching vehicle detecting unit 5a and on position information received in the past. Alternatively, based on an image imported from the periphery monitoring camera unit 1, the approaching vehicle travel direction detecting unit 5f calculates the direction of travel of the approaching vehicle based on a traveling lane of the approaching vehicle and turn signal illumination information, and outputs the calculated approaching vehicle travel direction information to the warning output determining unit 5d.

The warning output determining unit 5d decides on a warning method based on approaching vehicle information acquired by the approaching vehicle detecting unit 5a and approaching vehicle travel direction information acquired by the approaching vehicle travel direction detecting unit 5f, and causes the warning output unit 6 to generate an output. Also, when the driver operates the steering wheel, or activates a turn signal on a neighboring traveling lane side, in order to change lane to a neighboring traveling lane side on which an approaching vehicle exists, the warning output determining unit 5d determines whether the direction of travel of the approaching vehicle acquired by the approaching vehicle travel direction detecting unit 5f is the direction in which the own vehicle is changing lane, and generates an output when changing lane is dangerous, thereby causing the warning output unit 6 to operate.

As other configurations are the same as in the first embodiment, the same reference signs are allotted, and a description will be omitted.

Next, an operation of the vehicle-use rear side warning device 100 in the third embodiment will be described using a flowchart shown in FIG. 7.

Firstly, when a car ignition is activated (step S41), the CPU 5 acquires a vehicle rear side camera image, sensor information, a driver sight line detecting camera image, and a vehicle operating condition (steps S42 to S45), in the same way as in the flowchart shown in FIG. 3., and determines the existence or otherwise of an approaching vehicle, and the position of the approaching vehicle, based on the sensor information and the vehicle rear side camera image (step S46).

Next, based on sensor information imported by the sensor unit 2 and an image imported by the periphery monitoring camera unit 1, the approaching vehicle detecting unit 5a detects the existence or otherwise of an approaching vehicle, such as a vehicle or a motorcycle, in a detection region within a predetermined distance range on the rear side of the own vehicle, and calculates the position of the approaching vehicle when an approaching vehicle exists (step S47).

Next, the approaching vehicle travel direction detecting unit 5f calculates a direction of travel of the approaching vehicle based on current position information among approaching vehicle information imported by the approaching vehicle detecting unit 5a and on position information received in the past. Alternatively, based on an image imported from the periphery monitoring camera unit 1, the approaching vehicle travel direction detecting unit 5f calculates the direction of travel of the approaching vehicle based on a traveling lane of the approaching vehicle and turn signal illumination information (step S46), and outputs the calculated approaching vehicle travel direction information to the warning output determining unit 5d.

Next, the warning output determining unit 5d determines whether or not an approaching vehicle exists on the rear side of the own vehicle based on approaching vehicle information acquired by the approaching vehicle detecting unit 5a (step S47). When no approaching vehicle exists (N), the warning output determining unit 5d proceeds to step S53, as there is no need to carry out a rear side warning process.

Meanwhile, when an approaching vehicle exists (Y), the warning output determining unit 5d causes the warning output unit 6 to generate an output, thereby causing an indicator formed of an LED or the like installed in vicinities of the left and right side mirrors to be illuminated (step S48).

In a state wherein the indicator is illuminated, the warning output determining unit 5d determines from vehicle condition information imported by the vehicle condition detecting unit 3 whether or not the own vehicle is attempting to change lane to a neighboring traveling lane side on which the approaching vehicle exists (step S49). When the own vehicle is not attempting to change lane (N), the warning output determining unit 5d proceeds to step S53 with only the alert provided by visual information. When the own vehicle is attempting to change lane (Y), the warning output determining unit 5d determines whether the direction of travel of the approaching vehicle acquired by the approaching vehicle travel direction detecting unit 5f is the direction in which the own vehicle is changing lane (step S50). Herein, when the direction in which the own vehicle is changing lane is the direction of travel of the approaching vehicle (Y), the warning output determining unit 5d generates an output to the warning output unit 6, thereby causing a warning sound to be generated by a buzzer or the like (step S51), and causes the seat and the steering wheel to vibrate (step S52), in order to communicate the existence of the approaching vehicle to the driver more clearly by outputting auditory information and contact information, thereby prompting an interruption of the lane change operation. When the direction in which the own vehicle is changing lane is not the direction of travel of the approaching vehicle (N), the warning output determining unit 5d does not carry out a generation of a warning using an output of a warning sound or a vibration of the seat and the steering wheel, whereby excessive notification to the driver is restricted.

Lastly, in step S53, the CPU 5 determines whether or not the vehicle power supply is in an off-state, and when the vehicle power supply is in an on-state (N), the CPU 5 returns to step S42 and repeats the process until the vehicle power supply is in an off-state.

In the third embodiment, the rear side warning device 100 is caused to operate from an activated ignition state to a deactivated ignition state, but the rear side warning device 100 may be caused to start up automatically when the own vehicle speed is a speed equal to or greater than a threshold, or by the driver operating a switch, or the like.

In the third embodiment, as heretofore described, a configuration is such that when the own vehicle attempts to change lane when an approaching vehicle exists within a predetermined range in the periphery of the own vehicle, a warning output is controlled in accordance with whether or not the direction in which the own vehicle is changing lane is the direction of travel of the approaching vehicle. Because of this, a warning is carried out with respect to a dangerous approaching vehicle, and generation of a warning is restricted with respect to an approaching vehicle by which there is no fear of being neared, or which has sufficient leeway until coming near, because of which there is no excessive notification to the driver, and a pleasant driving environment can be provided.

In the heretofore described embodiments, the configuration is such that an approaching vehicle detecting unit that detects whether or not an approaching vehicle exists within a predetermined range on the rear side of the own vehicle is provided, but an approaching moving object detecting unit that detects a moving object that has come near, such as a motorcycle, a bicycle, a runner (person), or an animal, in addition to a vehicle may be provided.

Although embodiments of the present application have been described above, a summary of outlines of characteristic configurations and operations of the vehicle-use rear side warning device 100 of the present application is as follows.

A first characteristic configuration includes an approaching moving object detecting unit that detects whether or not an approaching moving object exists within a predetermined range on a rear side of an own vehicle, a relative speed detecting unit that detects relative speeds of an approaching moving object detected by the approaching moving object detecting unit and the own vehicle, and a warning output determining unit that, based on a result of a comparison of a relative speed detected by the relative speed detecting unit and a reference relative speed with respect to which a lane change can be carried out, outputs a warning when the approaching moving object detecting unit detects an approaching moving object and the own vehicle attempts to change lane to a neighboring traveling lane.

This kind of configuration is such that when a vehicle attempts to change lane when a vehicle exists within a predetermined range in the periphery of the vehicle, a warning output is controlled in accordance with the relative speed of an approaching moving object, whereby a warning is carried out with respect to a dangerous approaching moving object, and a warning is restricted with respect to an approaching moving object by which there is no fear of being neared, or which has sufficient leeway until coming near, because of which there is no excessive notification to the driver, and a pleasant driving environment can be provided.

A second characteristic configuration is characterized in that the warning output determining unit, which controls a warning output, controls a warning output of a warning output unit based on a result of a comparison of a relative speed detected by the relative speed detecting unit and the reference relative speed, and on position information regarding an approaching moving object detected by the approaching moving object detecting unit.

According to this kind of configuration, a more accurate warning output control can be carried out by controlling the warning output based on the relative speed of an approaching moving object and on position information.

A third characteristic configuration is characterized by including a vehicle periphery condition recognition state inferring unit that infers that the driver of a vehicle is recognizing the state of a road on the rear side in a neighboring traveling lane, wherein control of a warning output of the warning output unit is changed in accordance with the condition of the driver's recognition of the state of the road on the rear side.

According to this kind of configuration, warning output control is changed in accordance with whether or not a driver is recognizing the state of a road on the rear side, whereby generation of a warning beyond that which is necessary to a driver who is recognizing the state of the road on the rear side is restricted, because of which annoyance inflicted on the driver can be eliminated, and an appropriate warning can be generated with respect to a driver who is not recognizing the state of the road on the rear side.

A fourth characteristic configuration is characterized in that the warning output determining unit restricts a warning output of the warning output unit when the relative speed does not exceed the reference relative speed with respect to which a lane change can be carried out.

According to this kind of configuration, a warning output of the warning output unit is restricted with respect to a condition that is not dangerous when changing lane when the relative speed of a vehicle on the rear side is not exceeding the reference relative speed, whereby annoyance inflicted on the driver can be eliminated.

A fifth characteristic configuration is characterized in that the warning output unit outputs visual information formed of a light or a display, auditory information formed of a sound or a voice, and contact information formed of a vibration, and the warning output determining unit controls the output of the visual information, the auditory information, and the contact information.

This kind of configuration is such that by restricting a warning output of auditory information and contact information formed of a vibration, and outputting only visual information, a warning that annoys the driver is restricted, and the driver can be notified that an approaching moving object exists.

A sixth characteristic configuration includes an approaching moving object detecting unit that detects an approaching moving object within a predetermined range in the periphery of the own vehicle in a neighboring traveling lane neighboring the lane in which the vehicle is traveling, a collision time detecting unit that computes a time remaining until a collision between an approaching moving object detected by the approaching moving object detecting unit and the own vehicle, and a warning output determining unit that, based on the result of a comparison between a time obtained by the collision time detecting unit and a preset reference time, outputs a warning when an approaching moving object is detected by the approaching moving object detecting unit and the matter that the own vehicle is attempting to change lane is detected by a vehicle condition detecting unit.

This kind of configuration is such that when a vehicle attempts to change lane when a vehicle exists within a predetermined range in the periphery of the vehicle, a warning output is controlled in accordance with the time remaining until a collision between the approaching moving object and the own vehicle, whereby a warning is generated with respect to a dangerous approaching moving object, and a warning is restricted with respect to an approaching moving object by which there is no fear of being neared, or which has sufficient leeway until coming near, because of which there is no excessive notification to the driver, and a pleasant driving environment can be provided.

A seventh characteristic configuration is characterized in that a warning output of the warning output unit is restricted by the warning output determining unit when a time obtained by the collision time detecting unit is within the preset reference time.

This kind of configuration is such that when the time remaining until a collision between the own vehicle and a vehicle on the rear side does not exceed a reference time with respect to which a lane change can be carried out, and a lane change is not dangerous, a warning output of the warning output unit is restricted, and annoyance inflicted on the driver can be eliminated.

An eighth characteristic configuration includes an approaching moving object detecting unit that detects an approaching moving object within a predetermined range in the periphery of the own vehicle in a neighboring traveling lane neighboring the lane in which the vehicle is traveling, an approaching moving object travel direction detecting unit that detects whether or not the direction of travel of an approaching moving object is a direction differing from the direction of travel of the own vehicle, and a warning output determining unit that controls a warning output of the warning output unit when an approaching moving object is detected by the approaching moving object detecting unit and a matter that the own vehicle is attempting to change lane is detected by a vehicle condition detecting unit.

This kind of configuration is such that when a vehicle attempts to change lane when an approaching moving object exists within a predetermined range in the periphery of the own vehicle, a warning output is controlled in accordance with whether or not the direction of travel of the approaching moving object is a direction differing from that of the own vehicle, a warning is generated with respect to a dangerous approaching moving object, generation of a warning can be restricted with respect to an approaching moving object by which there is no fear of being neared, there is no excessive notification to the driver, and a pleasant driving environment can be provided.

Although the present disclosure is described above in terms of various exemplary embodiments, it should be understood that the various features, aspects, and functionality described in the embodiments are not limited in their applicability to the particular embodiment with which they are described, but instead can be applied, alone or in various combinations, to the embodiments.

It is therefore understood that numerous modifications that have not been exemplified can be devised without departing from the scope of the present application. For example, at least one constituent component may be modified, added, or eliminated.

REFERENCE SIGNS LIST

1: periphery monitoring camera unit, 2: sensor unit, 3: vehicle condition detecting unit, 4: driver sight line detecting camera unit, 5: central processing unit (CPU), 5a: approaching vehicle detecting unit (approaching moving object detecting unit), 5b: relative speed detecting unit, 5c: vehicle periphery condition recognition state determining unit, 5d: warning output determining unit, 5e: collision time detecting unit, 5f: approaching vehicle travel direction detecting unit, 6: warning output unit

The invention claimed is:

1. A vehicle-use rear side warning device, comprising:
   a periphery monitoring camera that acquires an image of a rear side of an own vehicle;
   a sensor that detects an approaching moving object existing on the rear side of the own vehicle;
   a vehicle condition detector that detects an operating condition of the own vehicle;
   an alarm system that displays visual information in the own vehicle and causes auditory information, and contact information formed of a vibration, to be generated; and
   a central processor that causes the alarm system to operate based on outputs of the periphery monitoring camera, the sensor, and the vehicle condition detector, wherein
   the central processor has an approaching moving object detector that detects an approaching moving object existing within a predetermined range on the rear side of the own vehicle based on outputs of the periphery monitoring camera and the sensor, a relative speed detector that detects relative speeds of an approaching moving object detected by the approaching moving object detector and the own vehicle, and a warning output determiner that, when an approaching moving object is detected by the approaching moving object detector and a matter that the own vehicle is attempting to change lane is detected by the vehicle condition detector, causes a warning of the alarm system to be generated when a relative speed detected by the relative speed detector exceeds a reference relative speed with respect to which a lane change can be carried out, based on outputs of the approaching moving object detector, the relative speed detector, and the vehicle condition detector, and
   wherein the warning output determiner determines whether a driver of the own vehicle recognizes a vehicle periphery condition of the own vehicle and adjusts the reference relative speed based on the determination of whether the driver of the own vehicle recognizes the vehicle periphery condition.

2. The vehicle-use rear side warning device according to claim 1, wherein the warning output determiner, which controls a warning output of the alarm system, causes a warning to be generated by the alarm system based on a result of comparing a relative speed detected by the relative speed detector and the reference relative speed, and on a position of an approaching moving object detected by the approaching moving object detector.

3. The vehicle-use rear side warning device according to claim 1, further comprising:
   a driver sight line detecting camera that detects a sight line of the driver of the own vehicle; and
   a vehicle periphery condition recognition state inferrer that infers that the driver of the own vehicle is recognizing a road state on the rear side in a neighboring traveling lane based on an output of the driver sight line detecting camera, wherein
   the warning output determiner changes a warning of the alarm system based on the condition of the driver's recognition of the rear side road state.

4. The vehicle-use rear side warning device according to claim 2, further comprising:

a driver sight line detecting camera that detects a sight line of the driver of the own vehicle; and a vehicle periphery condition recognition state inferrer that infers that the driver of the own vehicle is recognizing a road state on the rear side in a neighboring traveling lane based on an output of the driver sight line detecting camera, wherein the warning output determiner changes a warning of the alarm system based on the condition of the driver's recognition of the rear side road state.

5. The vehicle-use rear side warning device according to claim 1, wherein the warning output determiner restricts a warning output of the alarm system when the relative speed does not exceed the reference relative speed.

6. The vehicle-use rear side warning device according to claim 2, wherein the warning output determiner restricts a warning output of the alarm system when the relative speed does not exceed the reference relative speed.

7. The vehicle-use rear side warning device according to claim 3, wherein the warning output determiner restricts a warning output of the alarm system when the relative speed does not exceed the reference relative speed.

8. A vehicle-use rear side warning device, comprising:
a periphery monitoring camera that acquires an image of a rear side of an own vehicle;
a sensor that detects an approaching moving object existing on the rear side of the own vehicle;
a vehicle condition detector that detects an operating condition of the own vehicle;
an alarm system that displays visual information in the own vehicle and causes auditory information, and contact information formed of a vibration, to be generated; and
a central processor that causes the alarm system to operate based on outputs of the periphery monitoring camera, the sensor, and the vehicle condition detector, wherein the central processor has an approaching moving object detector that detects an approaching moving object existing within a predetermined range on the rear side of the own vehicle based on outputs of the periphery monitoring camera and the sensor, a collision time detector that detects a time remaining until a collision between an approaching moving object detected by the approaching moving object detector and the own vehicle, and a warning output determiner that, when an approaching moving object is detected by the approaching moving object detector and a matter that the own vehicle is attempting to change lane is detected by the vehicle condition detector, causes a warning of the alarm system to be generated based on a result of comparing a time detected by the collision time detector and a reference time with respect to which a lane change can be carried out, based on outputs of the approaching moving object detector, the collision time detector, and the vehicle condition detector, and
wherein the warning output determiner determines whether a driver of the own vehicle recognizes a vehicle periphery condition of the own vehicle and adjusts the reference time based on the determination of whether the driver of the own vehicle recognizes the vehicle periphery condition.

9. The vehicle-use rear side warning device according to claim 8, further comprising:
a driver sight line detecting camera that detects a sight line of a driver of the own vehicle; and
a vehicle periphery condition recognition state inferrer that infers that the driver of the own vehicle is recognizing a road state on the rear side in a neighboring traveling lane based on an output of the driver sight line detecting camera, wherein
the warning output determiner changes a warning of the alarm system based on the driver's recognition of the rear side road state.

10. The vehicle-use rear side warning device according to claim 9, wherein the warning output determiner restricts a warning output of the alarm system when a time obtained by the collision time detector is within the reference time with respect to which a lane change can be carried out.

11. A vehicle-use rear side warning device, comprising:
a periphery monitoring camera that acquires an image of a rear side of an own vehicle;
a sensor that detects an approaching moving object existing on the rear side of the own vehicle;
a vehicle condition detector that detects an operating condition of the own vehicle;
an alarm system that generates a warning based on a result of a determination by a warning output determiner to be described hereafter;
an approaching moving object detector that detects an approaching moving object existing within a predetermined range on the rear side of the own vehicle based on outputs of the periphery monitoring camera and the sensor; and
a relative speed detector that detects relative speeds of an approaching moving object detected by the approaching moving object detector and the own vehicle, wherein
the warning output determiner causes the alarm system to generate a first warning when the approaching moving object detector detects an approaching moving object, and furthermore, when the vehicle condition detector detects that the own vehicle is attempting to change lane, causes a second warning of the alarm system to be generated when a relative speed detected by the relative speed detector exceeds a reference relative speed with respect to which a lane change can be carried out, and causes the second warning of the alarm system to be restricted when a relative speed detected by the relative speed detector does not exceed the reference relative speed with respect to which a lane change can be carried out, and
wherein the warning output determiner determines whether a driver of the own vehicle recognizes a vehicle periphery condition of the own vehicle and adjusts the reference relative speed based on the determination of whether the driver of the own vehicle recognizes the vehicle periphery condition.

12. A vehicle-use rear side warning method, comprising:
a first step of detecting an approaching moving object existing within a predetermined range in a periphery of an own vehicle;
a second step of outputting a warning when the own vehicle attempts to change lane to a neighboring traveling lane when an approaching moving object is detected in the first step;
a third step of detecting relative speeds of the approaching moving object detected in the first step and the own vehicle; and
a fourth step of controlling the warning output of the second step based on a result of comparing a relative speed detected in the third step and a reference relative speed,
wherein the fourth step comprises determining whether a driver of the own vehicle recognizes a vehicle periphery condition of the own vehicle and adjusts the reference relative speed based on the determination of whether the driver of the own vehicle recognizes the vehicle periphery condition.

13. A vehicle-use rear side warning method, comprising:
- a first step of detecting an approaching moving object existing within a predetermined range in a periphery of an own vehicle;
- a second step of outputting a warning when the own vehicle attempts to change lane to a neighboring traveling lane when an approaching moving object is detected in the first step;
- a third step of computing a time remaining until a collision between the approaching moving object detected in the first step and the own vehicle; and
- a fourth step of controlling the warning output of the second step based on a result of comparing a time obtained in the third step and a reference time,
- wherein the fourth step comprises determining whether a driver of the own vehicle recognizes a vehicle periphery condition of the own vehicle and adjusts the reference time based on the determination of whether the driver of the own vehicle recognizes the vehicle periphery condition.

* * * * *